United States Patent Office 2,781,379
Patented Feb. 12, 1957

2,781,379

DETERGENT SULPHONIC ACID AND SULPHATE SALTS OF CERTAIN AMPHOTERIC DETERGENTS

Hans S. Mannheimer, New York, N. Y.

No Drawing. Application July 2, 1956,
Serial No. 595,076

5 Claims. (Cl. 260—401)

This invention relates to novel compositions and to methods for producing them. In one of its more specific aspects the invention is directed to the methods for making and to novel derivates of metal salts of polyamino acids, which I shall hereinafter term "polyamino acid metal salts." Said "polyamino acid metal salts" employed as starting materials in the practice of this invention have the following general formula:

FORMULA I

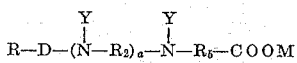

in which R is a hydrocarbon radical of at least 4 carbon atoms and for most purposes is 6–18 carbon atoms and may be aliphatic or aliphatic-aromatic; D is selected from the class consisting of $CH_2$ and $CONHR_2$; $R_2$ is unsubstituted or hydroxy substituted aliphatic hydrocarbon radical of 2–4 carbon atoms, such as $C_2H_4$, $C_3H_6$, $C_3H_5OH$; Y is selected from the class consisting of hydrogen, $R_7$ and $R_5COOM$; $R_5$ is an aliphatic hydrocarbon group of 1–4 carbon atoms, such as $CH_2$, $C_2H_4$, $C_3H_6$, $C_4H_8$ or an hydroxy substituted aliphatic hydrocarbon group of 2–4 carbon atoms, such as $CH_2CHOHCH_2$, or an aliphatic ether group of 3–4 carbon atoms containing a single ether oxygen linkage therein and otherwise being hydrocarbon or hydroxy substituted hydrocarbon; $R_7$ is selected from the class consisting of $CH_3$ and monovalent radicals otherwise defined as $R_2$ such as $C_2H_5$, $C_3H_7$, $CH_2OH$, $C_2H_4OH$, etc.; $a$ is an integer in the range of 1–5; M is an alkali metal and preferably sodium or potassium.

Said "polyamino acid metal salts" may be produced in a number of different ways well known to the art. For example, RCOOH may be reacted with a polyamine $NH_2R_2(NHR_2)_xNH_2$ in the mole proportion of 1 to 1 and water of reaction is removed in the well known manner to provide:

$$RCONHR_2(NHR_2)_xNH_2$$

For example, a hydrocarbon chloride $RCH_2Cl$ is reacted with a polyamine $NH_2R_2NH_2$ in the mole proportion of 1 to 1 and the hydrochloride of reaction is removed with caustic soda to produce:

$$RCH_2NHR_2NH_2$$

For example a hydrocarbon chloride $RCH_2Cl$ may be reacted with $H(NHR_2)_xNH_2$ in the mole proportion of 1 to 1 and the hydrochloride of reaction is removed with caustic soda to provide:

$$RCH_2(NHR_2)_xNH_2$$

Compounds of the last formula may be produced by reacting $RNH_2$ with ethylene oxide and ammonia.

Many polyamines are readily available in large commercial quantities. These amines are preferably employed in the production of my starting materials of this invention and have the following formulas and hereinafter known as reactants A, B, C, and D respectively:

$$NH_2C_2H_4NH_2$$
$$NH_2C_2H_4NHC_2H_4NH_2$$
$$NH_2C_2H_4NHC_2H_4NHC_2H_4NH_2$$
$$NH_2C_2H_4NHC_2H_4NHC_2H_4NHC_2H_4NH_2$$

These particular polyamines are generally produced by reacting ethylene oxide with ammonia. Polyamines containing additional ethyl amino groups can be obtained in the same manner. By employing propylene oxide instead of ethylene oxide homologues of the polyamines above set forth may be obtained, which contain propyl groups instead of the ethyl groups therein.

For example, glyceryl polyamines may be prepared by reacting 1 mole of epichlorhydrin

with 2 moles of aqueous ammonia in the well known manner to produce $NH_2CH_2CHOHCH_2NH_2HCl$ which is treated with caustic soda to remove the HCl to provide reactant E.

$$NH_2CH_2CHOHCH_2NH_2$$

which may be reacted with $RCH_2Cl$ in equimolecular proportions to provide compounds:

$$R\text{—}CH_2\text{—}NHCH_2CHOHCH_2NH_2$$

which may be employed in the production of starting materials.

Said $NH_2CH_2CHOHCH_2NH_2$ may be reacted with $NH_2CH_2CHOHCH_2Cl$ in the mole proportion of 1 to 1 and subsequently treated with caustic soda to remove the HCl to provide reactant F.

$$NH_2CH_2CHOHCH_2NHCH_2CHOHCH_2NH_2$$

Said $NH_2CH_2CHOHCH_2NH_2$ may be reacted with epichlorhydrin and ammonia and subsequently treated with caustic soda to obtain reactant G.

$$NH_2CH_2CHOHCH_2NHCH_2$$
$$CHOHCH_2NHCH_2CHOHCH_2NH_2$$

For example, butyl polyamines may be obtained by reacting butyl diamine $NH_2C_4H_8NH_2$ with butyl dichloride in the mole proportion of 2–1 and in the presence of caustic soda to obtain reactant H.

$$NH_2C_4H_8NHC_4H_8NHC_4H_8NH_2$$

For example 1 mole of said polyamines examples of which are reactants A–H may be respectively reacted with 1 mole respectively of lauryl bromide $C_{11}H_{23}\text{—}CH_2\text{—}Br$, capric bromide $C_9H_{19}\text{—}CH_2\text{—}Br$, nonyl benzyl chloride $C_9H_{19}\text{—}C_6H_4\text{—}CH_2Cl$ and subsequently treated with caustic soda to remove the HCl or HBr formed in the course of reaction to produce compounds in which a hydrogen of only one of the terminal $NH_2$ groups is replaced by $C_{11}H_{23}\text{—}CH_2\text{—}$, $C_9H_{19}\text{—}CH_2\text{—}$, $$C_9H_{19}\text{—}C_6H_4\text{—}CH_2\text{—}$$

with such methods being known to the art.

For example, 1 mole respectively of reactants B–E, G–H may be reacted with 1 mole of lauric acid $$C_{11}H_{23}COOH$$

capric acid $C_9H_{19}COOH$, nonyl benzoic acid $$C_9H_{19}\text{—}C_6H_4\text{—}COOH$$

until 1 mole of water of reaction has been formed and removed to provide compounds in which $C_{11}H_{23}\text{—}CO\text{—}$, $C_9H_{19}\text{—}CO\text{—}$, and $C_9H_{19}\text{—}C_6H_4\text{—}CO\text{—}$ respectively are substituted for a single hydrogen of only one of the terminal $NH_2$ groups, such methods being well known to the art.

The starting materials of this invention may be produced by reacting a polyamine which is at least a diamine with R—CH₂— halogen and subsequently treated with caustic soda, or a polyamine which is at least a triamine with RCOOH to provide

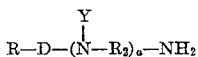

which may be reacted with monohalocarboxylic acid together with caustic soda or potassium hydroxide. The monohalocarboxylic acid generally used may be monochloracetic, monochlorlactic, monochloropropionic, etc. so that $R_5$ is $CH_2$, $C_2H_4$, $C_3H_6$, $C_4H_8$, $CH_2CHOH$, etc. In general the reaction is carried out by employing 1 mole of said compound and 1 or more moles of monohalocarboxylic acid and 2 moles of caustic soda or potassium hydroxide for each mole of monohalocarboxylic acid used. If the number of moles of monohalocarboxylic acid employed is less the number of hydrogens on the amine groups, apart from the H of the CONH group if said group is present, then 1 or more of them if desired may be reacted with $CH_3Cl$, $C_2H_5Cl$, $C_3H_7Cl$, ethylene chlorhydrin etc. then with caustic to provide radicals such as $C_2H_5$, $C_3H_7$, $C_2H_4OH$ etc. for one or more of such hydrogens.

The following are given merely by way of illustrating in general methods well known to the art for producing examples of starting materials which may be employed in the practice of this invention.

*Examples A–H*

1 mole of $C_{11}H_{23}$—$CH_2$—$NHC_2H_4NH_2$ is reacted with 1 mole of monochloracetic acid together with 2 moles of caustic soda to provide product A:

$$C_{11}H_{23}-CH_2-NHC_2H_4N\begin{matrix}H\\ \\CH_2-COONa\end{matrix}$$

1 mole of product A is reacted with 1 mole of monochlorlactic acid together with 2 moles of caustic soda to provide a mixture of product B and product B-1 of the following formulas:

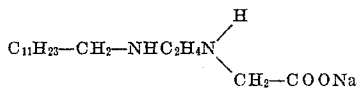

and

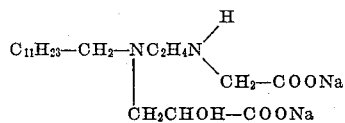

1 mole of mixture of products B and B-1 is reacted with 1 mole of monochlorpropionic acid together with 2 moles of caustic soda to provide products C and C-1 which are the same as products B and B-1 respectively except that $C_2H_4$—COONa is substituted for the hydrogens thereof attached directly to the nitrogens.

1 mole of product A is reacted with 2 moles respectively of methyl chloride and subsequently treated with caustic soda to remove the HCl of reaction to provide product D:

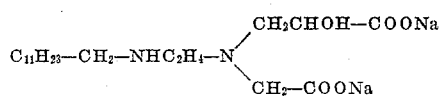

1 mole of product A is reacted with 2 moles of ethylene chlorhydrin and 2 moles of caustic soda to provide product E:

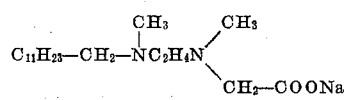

1 mole of product A is reacted with 3 moles of monochloracetic acid together with 6 moles of caustic soda to provide product F.

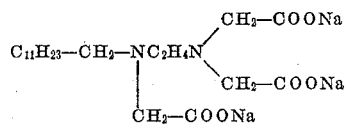

Using the same type of reactants as those employed for the production of product A except that $$C_9H_{19}-CH_2-$$

and $C_9H_{19}$—$C_6H_4$—$CH_2$— are respectively substituted for the radical $C_{11}H_{23}$—$CH_2$ to provide products G and H.

*Examples I–CC*

1 mole of $C_{11}H_{23}$—$CH_2$—$NHC_2H_4(NHC_2H_4)_3NH_2$ is reacted with 1 mole of monochloracetic acid together with 2 moles of caustic soda to replace a hydrogen of the NH₂ with —CH₂—COONa to provide product I.

1 mole of product I is reacted with 1–5 moles respectively of monochloracetic acid and 2–10 moles of caustic soda respectively to replace 1–5 of the hydrogen atoms attached directly to the nitrogen atoms thereof with 1–5 of —CH₂—COONa to provide products J–N.

1 mole of product I is reacted with 1–5 moles respectively of ethylene chlorhydrin and caustic soda to replace 1–5 of the atoms attached directly to the nitrogen atoms thereof with 1–5 of —C₂H₄OH to provide products O–S.

1 mole of product J is reacted with 1–4 moles respectively of ethylene chlorhydrin and caustic soda to replace 1–4 of the hydrogens attached directly to the nitrogen atoms with —C₂H₄OH to provide products T–W.

1 mole of product K is reacted with 1–3 moles respectively of ethylene chlorhydrin and caustic soda to replace 1–3 of the hydrogen atoms attached directly to the nitrogen atoms with —C₂H₄OH to provide products X–Z.

1 mole of product L is reacted with 1–2 moles respectively of ethylene chlorhydrin and caustic soda to replace 1–2 of the hydrogen atoms connected directly to the nitrogen atoms with —C₂H₄OH to provide products AA and BB.

1 mole of product M is reacted with 1 mole of ethylene chlorhydrin and caustic soda to replace the single hydrogen connected directly to a nitrogen atom with —C₂H₄OH to provide product CC.

*Examples DD–II*

1 mole of $C_{11}H_{23}$—CONH—$C_2H_4NHC_2H_4NH_2$ is reacted with 1 mole of monochloracetic acid together with 2 moles of caustic soda to provide product DD:

1 mole of product DD is reacted with 1–2 moles respectively of monochloracetic acid and 2–4 moles of caustic soda respectively to provide respective products EE and FF having the following respective formulas:

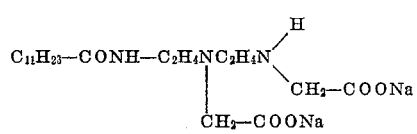

and

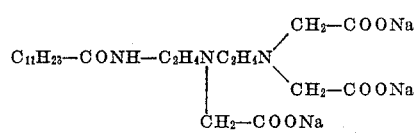

1 mole of product DD is reacted with 1–2 moles respectively of ethylene chlorhydrin and caustic soda to provide products GG and HH respectively having the following respective formulas:

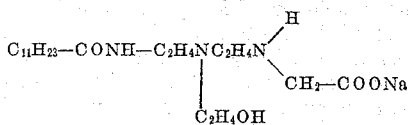

and

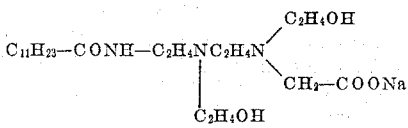

1 mole of product HH is reacted with 2 moles of monochloracetic acid and 2 moles of monochlorlactic acid respectively together with 4 moles of caustic soda respectively to provide products HH and II of the following respective formulas:

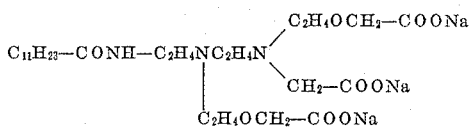

and

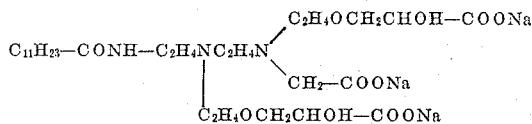

*Examples JJ–KK*

1 mole of $$C_9H_{19}-C_6H_4-CH_2-NHCH_2CHOHCH_2NH_2$$

produced by reacting $C_9H_{19}-C_6H_4-CH_2Cl$ with reactant E and using caustic soda, is reacted with 1 and 3 moles respectively of monochlorpropionic acid together with 2 and 6 moles of caustic soda respectively to provide products JJ and KK respectively:

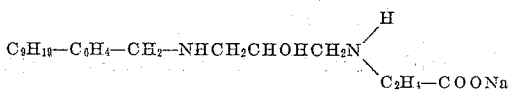

and

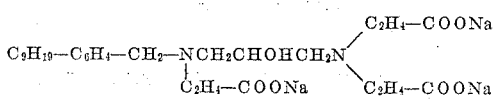

*Example LL*

1 mole of $$C_5H_{11}-C_6H_4-CONHCH_2CHOHCH_2(NHCH_2CHOHCH_2)_2NH_2$$

produced by reacting 1 mole of $C_5H_9-C_6H_4-COOH$ with 1 mole of reactant G, is reacted with 1 mole of monochloracetic acid together with 2 moles of potassium hydroxide to provide product LL:

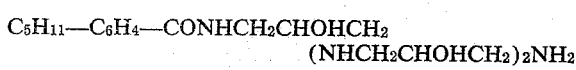

*Examples MM–VV*

1 mole of $C_{11}H_{23}CONHC_2H_4(NHC_2H_4)_3NH_2$ is reacted with 1 mole of monochloracetic acid together with 2 moles of caustic soda, whereby a hydrogen of the $NH_2$ group is replaced by $CH_2COONa$ which is product MM.

1 mole of product MM is reacted with 1–4 moles respectively of monochloracetic acid together with 2–8 moles of caustic soda to provide products NN, OO, PP, and QQ which are compounds the same as MM, except that 1–4 of the hydrogens attached to the nitrogens other than that of the $CONHC_2H_4$ group are replaced by $CH_2COONa$.

1 mole of product MM is reacted with 1–4 moles respectively of ethylene chlorhydrin and then treated with caustic soda, whereby 1–4 of the hydrogens thereof connected to such nitrogens other than that in the $CONHC_2H_4$ group is replaced by $C_2H_4OH$ to provide products RR, SS, TT, and UU.

1 mole of product MM is reacted with a mixture of 2 moles of monochloracetic acid and 2 moles of chlorhydrin and then treated with 6 moles of caustic soda, whereby two $CH_2COONa$ groups and two $C_2H_4OH$ groups replace the hydrogens attached to the nitrogen groups other than that in the $CONHC_2H_4$ groups. The product is VV.

The specific monocarboxylic acid, as well as the specific monohalomonocarbylic acids employed in certain examples, may be replaced by others as may be the various other reactants in the specific examples to provide a great number of other starting materials, which differ from those set forth in the examples heretofore set forth.

Prior to this invention, it was known that cationic surface active agents and anionic surface active agents when together in aqueous solution resulted in the production or formation of water insoluble compounds, and that adding an anionic surface active agent to an aqueous solution of another anionic surface active agent resulted in a mere physical combination of said agents and that no reaction would occur between them.

Said "polyamino acid metal salts" normally behave anionically in aqueous solutions having a pH above 7, and consequently it was expected that said "poylamino acid metal salts" when in aqueous solution together with anionic surface agents that they would be combined physically only and that no chemical reaction would occur therebetween. In the course of my experimentations, I have discovered that said "polyamino acid metal salts" could be reacted with certain anionic surface active agents at a pH above 7 to produce water-soluble reaction products. Not only did I make said discovery, but I further discovered that water solutions of such reaction products had viscosities greater than corresponding aqueous solutions of "polyamino acid metal salts" and also exhibited better foaming characteristics than did said "polyamino acid metal salts" in very low dilutions under extreme water hardness conditions. Said reaction products are non-toxic and non-irritating to the human skin. They have been found eminently useful as general utility detergents, such as for car washing, dish washing, clothes washing, etc. Said "polyamino acid metal salts" as well as compounds of Formula II, hereinafter described and mere physical mixtures of said "polyamino acid metal salts" and compounds of Formula II when used as components of shampoos sometimes caused slight irritation or stinging of the eyes when such shampoos were used and water solutions thereof accidentally reached the eyes. I have further discovered that the reaction products of this invention caused practically no irritation or stinging of the eyes when so employed.

According to this invention, one or a combination of two or more of said "polyamino acid metal salts" of the general structural Formula I are reacted with one or a combination of two or more anionic surface active agents of the following general structural Formula II to provide novel, water-soluble compounds having the following general structural Formula III, and having high wetting, detergency and surface active properties and capable of providing voluminous and stablefoams in aqueous solutions, and which aqueous solutions are substantially non-irritating to the skin and eyes of normal human beings.

FORMULA II $$R_3-X-M$$

FORMULA III

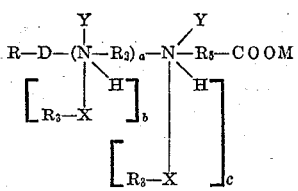

wherein $R_3$ is a hydrocarbon radical, either aliphatic containing 6–18 carbon atoms, or aliphatic-aromatic consisting of a benzene ring or a naphthalene ring having an aliphatic radical of at least 6 carbon atoms attached thereto; X is $OSO_3$ or $SO_3$; M, R, D, $R_2$, $R_5$, Y, and $a$ have heretofore been defined in Formula I; and $b$ is zero to 5 and no greater than $a$; $c$ is zero to 1; the sum of $b$ and $c$ is at least 1.

According to this invention, I react a compound of Formula I with a compound of Formula II to provide the novel and highly useful compounds of Formula III. In general, this reaction is carried out in a solution containing compounds I and II and to which a quantity of an acidic agent such as a strong mineral acid, as for example hydrochloric, sulphuric or its equivalent, has been added to lower the pH of the solution to a value of approximately 7 to approximately 9 and while maintaining the mass at a temperature between approximately 100–200° F. In this reaction under the aforesaid conditions, the compounds of Formula III are produced, said compounds having high water solubility in spite of the fact that the number of carbon atoms in $R_3$ is 6 or more. Such compounds of Formula III have an unexpected extremely high water-solubility, while the corresponding salts of cationic compounds are water-insoluble. The resultant aqueous solution can be used directly as a surface active agent, wetting agent or detergent for the purposes indicated for the "polyamino acid metal salts." While the quantities of the compound of Formula I and compound of Formula II may be equimolecular for good yield of compounds of Formula III, I may employ an excess of either, and in general the mole ratio of a compound of Formula I to compound of Formula II may be 2 moles of the former to 1–10 moles of the latter depending upon the particular compound of Formula II employed.

One of the specific methods which I prefer to employ in carrying out an aspect of this invention is to first dissolve about 1 mole of a compound of Formula I in a quantity of water measuring about 1.5 times the weight of compound of Formula I used and then the pH thereof is adjusted to approximately 12–13 (measured electrically) by the addition of aqueous caustic soda if required so that when a compound of Formula II is added thereto, the pH of the solution of I and II will be at least 10 and generally 10.5–11. The temperature of said solution is raised to 100–200° F. and preferably in factory practice to approximately 140° F. Then about 1–5 moles of a compound of Formula II is dissolved in a quantity of water measuring by weight 1.5 times the quantity of compound of Formula II in a separate container and this solution is added to said first solution and the mass is maintained in said temperature range while being constantly stirred, and an acidic agent is added thereto to reduce the pH thereof to a value below 10 and in the range of approximately 7 to 9, and preferably of approximately 8.2 to approximately 8.7. At the end of the acidic agent addition, the stirring is continued and the temperature of the mass maintained for about 10–20 minutes after which the solution is allowed to cool and is a finished product.

The following are specific examples merely given by way of illustrating the invention and are not to be taken by way of limitation, all parts being given by weight unless otherwise specified.

Example 1

An aqueous solution of 310 parts of product A in 460 parts of water is heated to approximately 140° F. and its pH (measured electrically) is adjusted by the addition of aqueous caustic soda to 12–13. While being constantly stirred and maintained at that temperature, there is added a solution of 290 parts of:

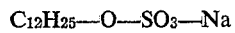

in 450 parts of water. Then while stirring and the temperature is maintained, there is added thereto between about 30–40 parts of hydrochloric acid solution (32%), whereby the pH of the mass is lowered to a value in the range of 8.2 to 8.7. Stirring is continued and the temperature maintained for about 10 minutes more. The resultant product is a solution of the novel reaction product, having the following formula:

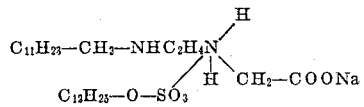

Example 2

Employ the same procedure and components as set forth in Example 1, except that only 150 parts of

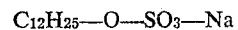

are used. In this instance the resultant product is a solution of the novel reaction product whose structural formula is shown in Example 1 together with unreacted product A used, in the approximate proportion of 2 parts of the former to 1 of the latter.

Employ the same procedure as that set forth in Example 1, but employ the components indicated in the following examples; the quantity of hydrochloric acid solution (32%) is variable to lower the pH to values indicated in Example 1 to obtain the novel reaction products of the following examples.

Example 3

500 parts of product B in 750 parts of water. 720 parts of:

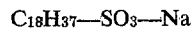

in 1400 parts of water.

FORMULA OF NOVEL REACTION PRODUCT

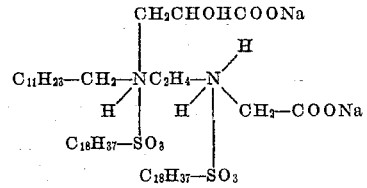

Example 4

510 parts of product C in 760 parts of water. 330 parts of:

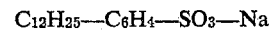

in 500 parts of water.

FORMULA OF NOVEL REACTION PRODUCT

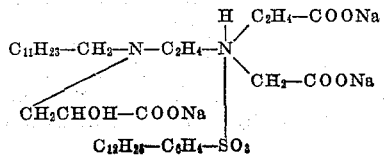

Example 5

450 parts of product H in 700 parts of water. 600 parts of:

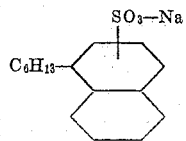

in 900 parts of water.

FORMULA OF NOVEL REACTION PRODUCT

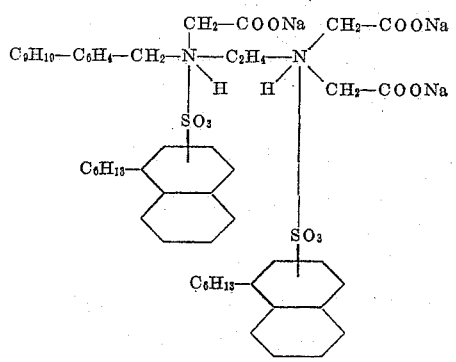

Example 6

425 parts of product I in 650 parts of water. 800 parts of:

$$C_6H_{13}-OSO_3-Na$$

in 1600 parts of water.

FORMULA OF NOVEL REACTION PRODUCT

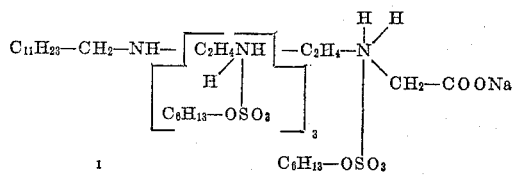

Example 7

850 parts of product N in 1300 parts of water. 320 parts of:

$$C_{10}H_{21}-C_6H_4-SO_3-K$$

in 600 parts of water.

FORMULA OF NOVEL REACTION PRODUCT

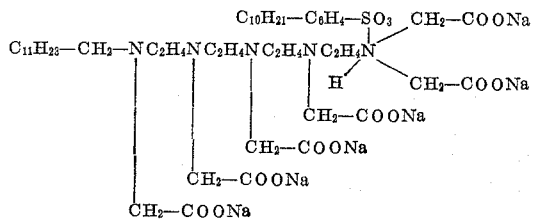

Example 8

410 parts of product GG in 620 parts of water. 320 parts of:

$$C_8H_{17}-C_6H_4-SO_3-K$$

in 500 parts of water.

FORMULA OF NOVEL REACTION PRODUCT

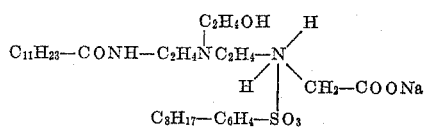

Example 9

365 parts of product DD in 500 parts of water. 400 parts of:

$$C_{10}H_{21}-SO_3-Na$$

in 600 parts of water.

FORMULA OF NOVEL REACTION PRODUCT

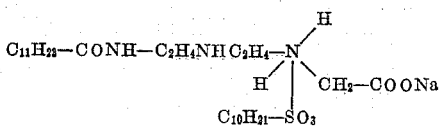

Example 10

675 parts of product II in 1,000 parts of water. 300 parts of:

$$C_7H_{15}-C_6H_4-SO_3-Na$$

in 900 parts of water.

FORMULA OF NOVEL REACTION PRODUCT

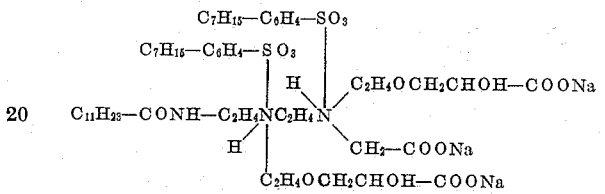

Employing the same procedure as that set forth in Example 1, except that 1 mole proportion of products B–VV are respectively substituted for product A to provide other novel reaction products which are respectively the same as the formula of the novel reaction product of Example A except that there is substituted formulas of B–LL respectively for the formula of product A therein.

Following the same procedure as that set forth in Example 1 and employing 1 mol of any of said other starting materials of Formula I respectively, and 1 mol of any of the other specific compounds of Formula II, a great number of other novel reaction products whose formulas are that of Formula III may be produced; and in addition, the specific reactants employed may differ from those employed herein, within the definitions thereof, to provide a great number of other compounds of Formula III.

It is to be understood that instead of first adjusting the pH of the compound of Formula I to 12–13 before the addition of the compound of Formula II, any other method may be employed to obtain the condition whereby the pH of the solution of I and II is at least 10 and preferably 10.5–11 before the addition of the acidic agent to lower the pH of the mass to approximately 7 to approximately 9. For example, I and II may be dissolved together and this solution may, by the addition of caustic soda when required, have its pH adjusted to at least 10, and then at 100–200° F. is ready for the addition of the acidic agent to lower its pH to approximately 7 to approximately 9. If desired, the required amount of acidic agent may be added either before or after the solution of pH of at least 10 is brought to a temperature in the range of 100–200° F.

It is also to be understood that when either $SO_3$ or $OSO_3$ is used in the specification or claims, it is meant to indicate either one or the other because of their obvious equivalency; it is also to be understood that the use of Na in the specification and claims is meant to indicate any of the other alkali metals because of their obvious equivalency, and it also is to be understood that aliphatic as employed in the specification and claims in definition of R is meant to include straight and also branch chain alpihatic and cycloaliphatic.

Since certain changes in carrying out the aforesaid processes and certain modifications in the compositions which embody the invention may be made without departing from its scope, it is intended that all matter contained in the description shall be interpreted as illustrative and not in a limiting sense.

It is also to be understood that the following claims are intended to cover all the generic and specific features of the invention herein described, and all statements of the scope of the invention which as a matter of language might be said to fall therebetween.

This application is a continuation-in-part of my co-pending application Ser. No. 575,300 filed April 2, 1956.

I claim:
1. A compound of the following formula:

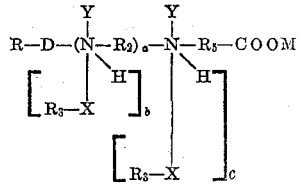

in which R is selected from the class consisting of aliphatic and aliphatic-aromatic hydrocarbon radicals of 6–18 carbon atoms; D is selected from the class consisting of $CH_2$ and $CONHR_2$; $R_2$ is selected from the class consisting of (a) aliphatic hydrocarbon radicals of 2–4 carbon atoms, (b) hydroxy substituted hydrocarbon radicals of 2–4 carbon atoms; Y is selected from the class consisting of (c) hydrogen, (d) $R_7$ and (e) $R_5$ COOM; $R_5$ is selected from the class consisting of (f) hydrocarbon groups of 1–4 carbon atoms, (g) hydroxy substituted hydrocarbon groups of 2–4 carbon atoms, (h) ether groups, each of said groups having an ether oxygen linkage therein and otherwise being hydrocarbon of 3–4 carbon atoms, (i) ether groups, each of said groups having an ether oxygen linkage therein and otherwise being hydroxy substituted hydrocarbon of 3–4 carbon atoms; $R_7$ is selected from the group consisting of $CH_3$ and monovalent radicals otherwise defined in $R_2$; $a$ is 1–5; $b$ is zero to 5 and no greater than $a$; $c$ is zero to 1; the sum of $c$ and $b$ is at least one; $R_3$ is selected from the group consisting of (j) aliphatic hydrocarbon atoms of 6–18 carbon atoms and (k) aliphatic-aromatic hydrocarbon radicals having a maximum of 18 carbon atoms and consisting of benzene and naphthalene groups each having attached an aliphatic group of at least 6 carbon atoms; X is selected from the group consisting of $SO_3$ and $OSO_3$; and M is an alkali metal.

2. A compound defined in claim 1, and with R, D, $R_2$, $R_3$ and $R_5$ being hydrocarbon as therein defined.

3. A compound defined in claim 1, and with D being CONH and R, $R_2$, $R_3$ and $R_5$ being hydrocarbon as therein defined.

4. A compound defined in claim 1, with R being $C_{11}H_{23}$ and $R_3$ being $C_{12}H_{25}$ and D, $R_2$ and $R_5$ being hydrocarbon as therein defined.

5. A compound defined in claim 1, with R being $C_{11}H_{23}$, $R_3$ being $C_{12}H_{25}$, D being $CH_2$ and $R_2$ and $R_5$ being hydrocarbon as therein defined.

References Cited in the file of this patent

UNITED STATES PATENTS

| | | |
|---|---|---|
| 2,103,872 | Schoeller et al. | Dec. 28, 1937 |
| 2,329,406 | Mauersberger | Sept. 14, 1943 |
| 2,619,467 | Isbell | Nov. 25, 1952 |

OTHER REFERENCES

Freese et al.: American Perfumer, "Shampoo Uses," March 1956, pages 37–40.